US007811508B2

(12) United States Patent  
Vignali et al.

(10) Patent No.: US 7,811,508 B2  
(45) Date of Patent: Oct. 12, 2010

(54) PROCESS FOR COLOURING CERAMIC MATERIALS

(75) Inventors: Graziano Vignali, Via Porretiana, 210, 40037 Sasso Marconi, Bologna (IT); Fabrizio Guizzardi, Bologna (IT); Michele Giorgi, Bologna (IT)

(73) Assignee: Graziano Vignali, Sasso Marconi, Bologna (IT)

( * ) Notice: Subject to any disclaimer, the term of this patent is extended or adjusted under 35 U.S.C. 154(b) by 753 days.

(21) Appl. No.: 10/584,257

(22) PCT Filed: Dec. 22, 2004

(86) PCT No.: PCT/EP2004/053680

§ 371 (c)(1),  
(2), (4) Date: Jun. 23, 2006

(87) PCT Pub. No.: WO2005/063650

PCT Pub. Date: Jul. 14, 2005

(65) Prior Publication Data

US 2007/0152381 A1 Jul. 5, 2007

(30) Foreign Application Priority Data

Dec. 23, 2003 (IT) .......................... MI2003A2570

(51) Int. Cl.  
*B28B 1/00* (2006.01)

(52) U.S. Cl. ...................................... 264/602; 264/643
(58) Field of Classification Search ................. 264/602, 264/643  
See application file for complete search history.

(56) References Cited

U.S. PATENT DOCUMENTS 6,228,160 B1 * 5/2001 Hanich et al. ............... 106/456

FOREIGN PATENT DOCUMENTS

| DE | 198 56 070 A | 6/2000 |
| EP | 1 264 811 A | 12/2002 |
| WO | 02/10092 A | 2/2002 |

OTHER PUBLICATIONS

ISA International Search Report.

* cited by examiner

*Primary Examiner*—Eric Hug  
*Assistant Examiner*—Russell J Kemmerle, III  
(74) *Attorney, Agent, or Firm*—Lorusso & Associates

(57) ABSTRACT

The invention relates to a new process for coloring ceramic materials by using aqueous solutions of chromophore ions. In particular, certain types of silica are added to the ceramic mixes which are to be colored, after which aqueous or organic solutions comprising inorganic salts of Fe (II) and/or Fe (III), or organic derivatives of Fe (II) and/or Fe (III) are applied to the surface of the said additive-containing ceramic mixes.

23 Claims, 4 Drawing Sheets

PROCESS FOR COLOURING CERAMIC MATERIALS

FIELD OF THE INVENTION

The invention relates to a new process for colouring ceramic materials using aqueous solutions of chromophore ions.

STATE OF THE ART

Aqueous or hydroalcoholic solutions based on organic salts and/or complexes of chromophore ions have been used for some time to decorate unfired or partially fired ceramic materials. Because of their diffusive properties, the colorant solutions penetrate into the interior of the ceramic material from the surface to which they are applied, to develop "in situ" coloration during firing of the material. The vertical and lateral diffusion of the colorant solutions makes it possible to obtain aesthetic effects which are much appreciated by the market, such as smoky toned decorations, chiaroscuro effects and depth effects normally not obtainable using more traditional solid ceramic pigments. By penetrating a few millimeters into the material, these colorant solutions also make it possible to obtain decorated articles which can be machined even after firing, by removing their surface layer to form polished or lapped products without compromising the appearance of the decoration.

The first colorant solutions to find industrial application in the ceramic sector were aqueous solutions of inorganic salts of some transition metals (as described in DE 20 12 304); subsequently the same chromophore ions were also used in the form of organic salts and/or complexes.

By using the available colorant solutions a fairly wide chromatic range can be obtained. It has been known for some time by the expert of the art that aqueous solutions of organic derivatives of cobalt, chromium and nickel can be used to obtain the colours blue, green or beige respectively on the finished product.

The search for new colours, which widen the available chromatic range by the application of aqueous solutions, is however constantly under way. The first direction of research relates to the possibility of using chromophore metals different from those traditionally used for colouring ceramic materials: for example EP 704 411 describes the use of aqueous solutions of Ru organic salts to obtain the colour black; German patent DE 195 19 168 describes the use of aqueous Pd solutions to obtain a grey colour and finally EP 1 105 358 describes the use of solutions of organic Au derivatives to obtain colours from pink to violet.

In more recent times, the search for new colorations has been directed towards the study of the combined use of colorant solutions containing chromophore ions and solid additives to be added to the ceramic mixes.

By adding particular additives to the raw materials new and unpredictable colorations can be obtained, in that the additive interacts with the chromophore ions to modify the chromatic yield. Thus for example, patent application EP 888 260 describes a process for obtaining certain new colorations based on the addition of $TiO_2$, $SnO_2$, $Zro_2$ and $ZrSiO_4$ to the ceramic mix, followed by treatment with aqueous colorant solutions of chromophore ions.

As a further example, WO 02/10092 described colouring processes requiring the addition of melt-lowering additives like Zn oxide or Zn silicate to the ceramic mass to obtain pink-orange shades on the surface of the ceramic material.

In spite of the research carried out so far, no coloration process is currently known using aqueous colorant solutions which enables the development of colour tones in the range from brownish-red to pinkish-orange, in particular of the brownish-red tones to be obtained on the surface and/or the interior of the fired ceramic material.

To obtain these colorations it is known from the state of the art to use iron-based solid ceramic pigments, either natural (Gres de Thivièrs) or synthesised (synthetic Gres de Thivièrs). The solid pigments are normally added to the ceramic mix throughout, so that the brownish-red colour develops through the entire thickness of the article; with this technique only simple decorations with limited aesthetic effects (salt and pepper type) can be obtained. Alternatively, the solid pigments can be applied superficially onto the tile by silk-screen printing; in this manner decorations similar to those achieved using aqueous colorant solutions of soluble compounds can be obtained, but only on the surface of the tiles, without however obtaining the elevated aesthetic results required by the market and enabled only by the aqueous colorant solutions (smoky effect, chiaroscuro effects and depth penetration). The natural Gres de Thivièrs contains about 90% of silicon oxide in the form of quartz and 10% goethite (FeOOH). Various methods for preparing synthetic Gres de Thivièrs are known in the prior art; from patent application EP 933 404 it is known for example to prepare a stain consisting of synthetic Gres de Thivièrs starting from iron compounds, a pulverulent matrix consisting of an oxide and/or a silicate (in particular amorphous silicate) and one or more auxiliary substances. According to that process, the iron compound is brought into intimate contact with an at least 50% amorphous pulverulent matrix, having a surface area exceeding 40 $m^2/g$, possibly in the presence of auxiliary substances of silicon oil type, for a time variable typically between 0.1 and 10 hours. These stains can be used in a manner similar to traditional pigments for through coloration of the ceramic materials. Alternatively they can be used as components for the preparation of colorant compositions for surface applications. Even if applied to the surface of the ceramic material in the form of colorant compositions, the presence of oxides and/or silicates suspended in the composition prevents penetration of the colour into the interior of the ceramic mass. It is therefore not possible, even using these stains as colorants applied to the surface of the material, to obtain a brownish-red coloration in the interior of the ceramic mass which allows the aesthetic results comparable to those obtainable with aqueous colorant solutions of chromophore ions.

TECHNICAL PROBLEM

The technical problem therefore exists of finding a new process for colouring ceramic materials on surface and/or in interior, using colorant solutions containing chromophore ions, which enables, after firing:

a) the attainment of colours currently not yet obtainable with this coloration method, b) the improved access to colours currently available, but exclusively through processes having the disadvantage to require a strong re-balancing of the ceramic mix to avoid excessive fusibility brought about by melt-lowering additives.

DESCRIPTION OF THE INVENTION

Figure 1:
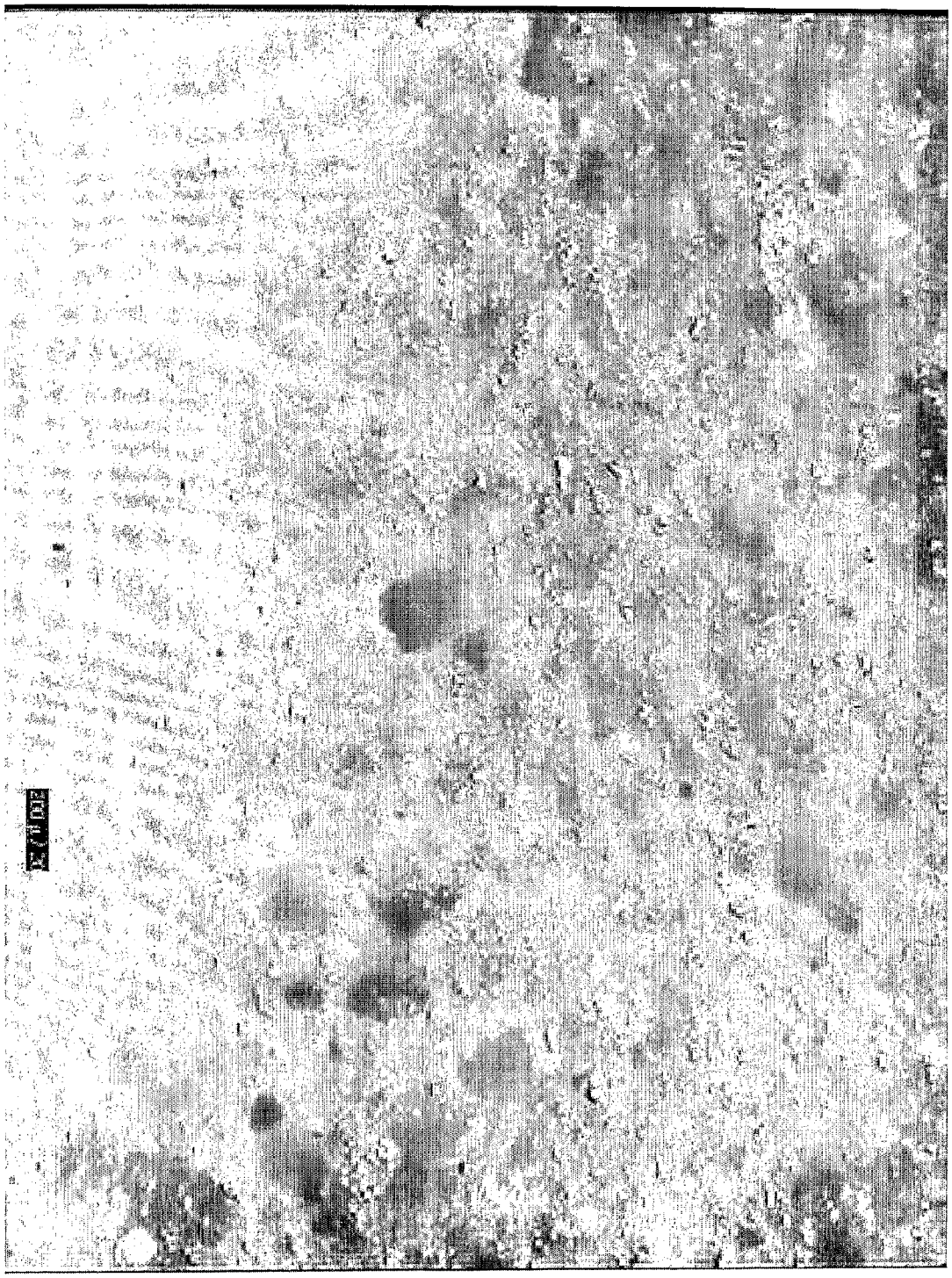
FIG. 1 is a photograph of a ceramic tile prepared and treated with the method according to the present invention, in particular of example 3 [i.e. employing 5% Wide Pore Silica-Meigao Gel as additive to the ARKIM porcelain stoneware powder referenced in the present Application and 2.5% aqueous Fe (as ammonium citrate) as colorant solution (1 drop; weight 0.047±0.005 g, average diameter of the colour spot formed: 1.3 cm); the tile having been smoothed after development] taken at the borderline of the applied drop of the colouring solution and showing that the ceramic articles obtainable according to the method of the present invention display chromophore microparticles of about 1-0.60 μm, preferably 5-60 μm in diameter, resolvable with an optical microscope at up to 200 magnifications (preferably up to 400 magnifications) operated with polychromatic external light provided through an optical fibre equipped with a "daylight" filter.
Figure 2:
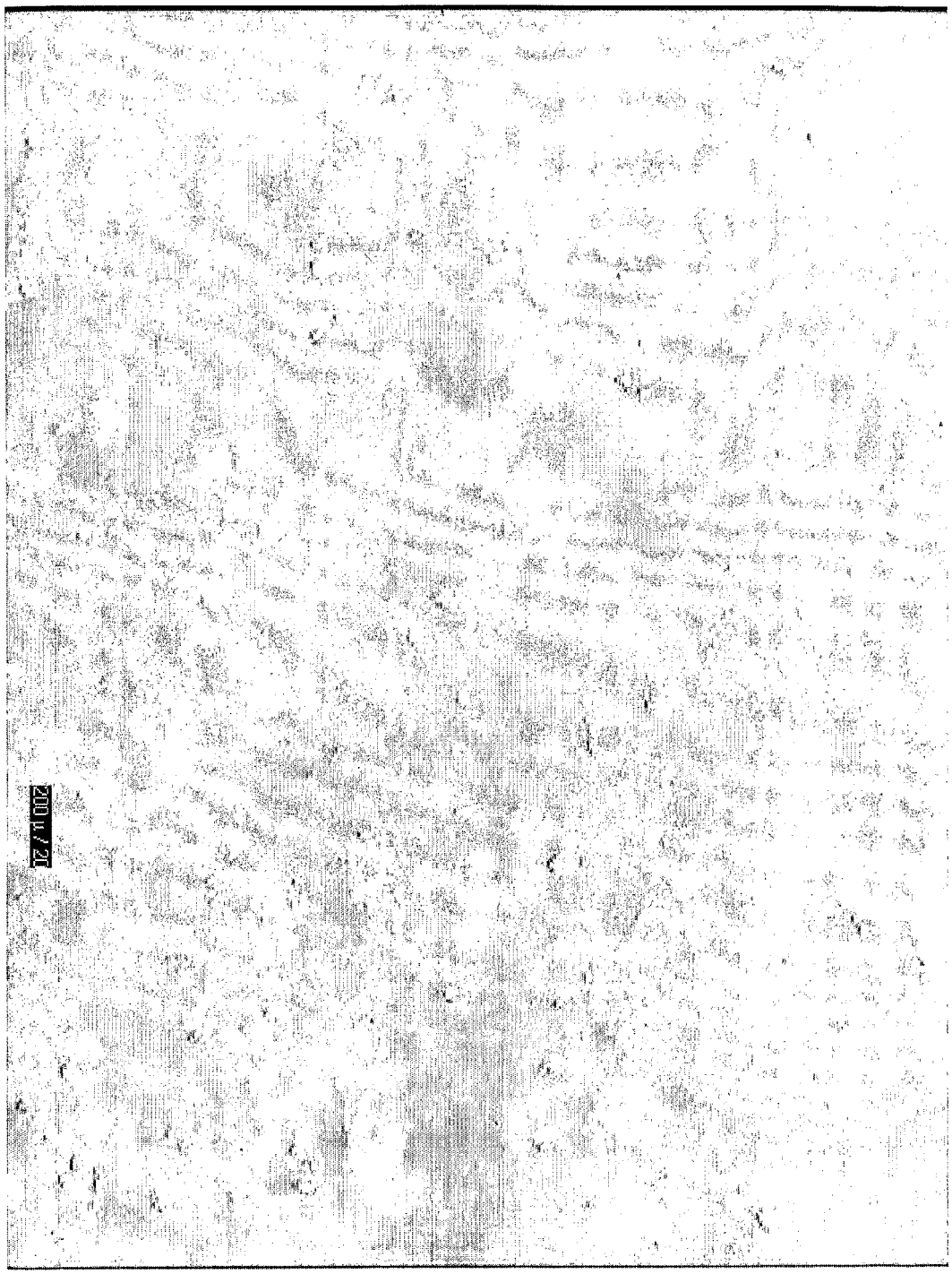
FIG. 2 is a photograph of a ceramic tile prepared on a metallic net and treated with the method according to WO 02/10092, in particular of a tile obtained employing 12.5% ZnO as additive to the ARKIM porcelain stoneware powder referenced in the present Application and 4.4% aqueous Cr (as acetate) as colorant solution (1 drop; weight 0.047±0.005 g, average diameter of the colour spot formed: 1.3 cm); the tile, due to its lack of evenness not having been smoothed after development, taken at the borderline of the applied drop of the colouring solution with an optical microscope at up to 200 magnifications (preferably up to 400 magnifications) operated with polychromatic external light provided through an optical fibre equipped with a "daylight" filter.

The above and further technical problems will appear herein after are solved by a new coloration process which enables a variation of the resultant colour of iron-based colorant solutions to be obtained on the surface and/or the interior of the fired ceramic material, characterised by;

(a) adding to the ceramic mix from 1% to 15% by weight, with respect to the dry ceramic mix, of precipitated silica and/or silica gel having an active surface $S \geqq 100$ m$^2$/g at the moment of coloration, said active surface S being defined by the formula $S = A*Gr$, where:

Gr is the particle size fraction—expressed in volume-percent—comprised between 5 and 60 micron for precipitated silica and between 1 and 60 micron for silica gel, and A is the surface area of the silica expressed in m$^2$/g measured by the B.E.T. method;

(b) applying to the surface of the additive-containing ceramic mix solutions comprising iron, in particular aqueous or organic solutions comprising inorganic salts of Fe(II) and/or Fe(III), or organic derivatives of Fe(II) and/or Fe(III);

(c) the variation in the resultant colour being equal to $\Delta E > 6$.

In the CIELab system the quantity $\Delta E$ expresses the difference between two colours and is defined on the basis of the difference between the chromatic co-ordinates L*, a* and b* of the colour of interest (sample) compared with the chromatic co-ordinates of the standard (std), by the formula $$\Delta E = [(\Delta L^*)^2 + (\Delta a^*)^2 + (\Delta b^*)^2]^{1/2}$$

in which
$\Delta L^* = L^*(\text{sample}) - L^*(\text{std})$,
$\Delta a^* = a^*(\text{sample}) - a^*(\text{std})$ and
$\Delta b^* = b^*(\text{sample}) - b^*(\text{std})$ The process of the invention enables a variation in the resultant colour of iron-based colorant solutions to be obtained equal to $\Delta E > 6$, assuming as reference (std) the coloration developed by the same solutions of the same ceramic mix without addition of silica. Although normally two colours are visually perceived as different if $\Delta E > 1$, a difference $\Delta E > 6$, characterised by a positive delta a* (increase in the degree of red) and by a negative delta L* contribution (increase in the colour intensity), is in this case necessary to obtain a brownish-red tone of commercial interest. The above-described variation in the chromatic yield is due to the interaction between the iron chromophore ion and the silica, according to the invention, added to the ceramic mix. On ceramic material obtained from mixes of traditional composition, the iron-based colorant solutions develop, after firing, a coloration from beige to dark brown on the unsmoothed material and various tones from beige to light brown in the interior of the ceramic body, depending upon the depth of smoothing, the quantity of iron applied which in its turn is a function of the quantity of solution used, and of its iron concentration. The addition of silica according to the process of the present invention to the mix makes it possible to obtain coloration from brownish-red to pinkish-orange, in particular of brownish-red, both on the surface, on the unsmoothed ceramic material, and in the interior of the ceramic mass, and hence on a smoothed product. The present invention also concerns the ceramic mix containing the precipitated or gel silica additives according to the present invention, as well as the final ceramic article obtainable through the herein described process.

Within the calorimetric space L*a*b*, L* indicates luminosity and is a value which varies between 0 and 100 (in which 0 represents black and 100 white); a* and b* represent respectively the red(+a*)/green(−a*) component and the yellow(+b*)/blue(−b*) component. In terms of difference in chromatic co-ordinates, the process according to the invention enables a $\Delta E > 6$ to be obtained which is manifested essentially by: $\Delta L^*$ negative, i.e. the colour obtained on mixes with added silica according to the invention is "darker" than the reference colour, and $\Delta a^*$ positive, i.e. the resultant colour of the iron solutions on ceramic mixes with added silica according to the invention has a greater red component.

The precipitated silica and silica gel usable for implementing the invention are characterised by an active surface $S \geqq 100$ m$^2$/g defined by the formula $S = A*Gr$, where S represents that portion of the total surface area (A) deriving from the percentage fraction of silica having "active particle size" (Gr). As is customary in this technical field, the percentage values of Gr are expressed in percent of volume (%/V/V).

Example: a silica gel having A=250 m$^2$/g and Gr of 50% will have S=125 m$^2$/g. The active particle size is between 5 and 60 micron for precipitated silica and between 1 and 60 micron (preferably between 2 and 60 micron) for silica gel. The active particle size fraction identifies the silica, which at the moment of treatment of the additive-containing mix with the colorant solutions, possesses the suitable particle size for interacting with said solutions, giving rise to the variation in the resultant colour. The variation in the resultant colour is uniform for silicas having active particle size Gr within the indicated range; precipitated silica and silica gel with particle size exceeding 60 micron give rise to uneven chromatic variations (spotted), with unsatisfactory aesthetic results. Precipitated silicas with particle size less than 5 micron and silica gel with particle size less than 1 micron do not give rise to significant chromatic variations.

The particle size referred to is that obtained by a particle size analyzer with laser diffraction detector as stated in the standard ISO 13320-1 (1999), equipped with wet sampler. The silica samples are normally treated prior to the analysis (for example by agitation, ultrasound treatment or addition of surfactants) so as to obtain a stable dispersion of the particles in the solvent used for the determination (generally water). In the case of precipitated silicas and silica gels these treatments break down the labile tertiary structures (aggregates) and the particle size measured corresponds to that of the secondary stable particles (agglomerates).

A represents the total surface area of the silica expressed in $m^2/g$ and measured using the B.E.T. method (nitrogen porosimeter). For porous materials, the contribution by the external surface of the particles to the surface area is negligible and the total surface area coincides almost completely with the internal surface area deriving from the porosity of the material. Therefore, the greater the total surface area, the greater is the porosity of the material. In order to satisfy the $S \geqq 100$ $m^2/g$ condition, the precipitated silicas and the silica gels usable for implementing the invention must be porous materials, i.e. they must have a B.E.T. area of $A \geqq 100$ $m^2/g$ deriving from the internal surface of the pores and at the same time they must have suitable particle size, that is to say a particle size fraction Gr closer to 100% the more nearly the value of the surface area A exceeds 100 $m^2/g$. Silicas having a low surface area due essentially to the external surface of the particles have S values less than 100 $m^2/g$ and are not suitable to be used in the process of the invention. In this respect they do not possess sufficient porosity and hence sufficient active surface S, whatever their active particle size fraction Gr. Even silicas with surface area $A \geqq 100$ $m^2/g$ deriving essentially from the external surface area of the particles cannot be employed in the process of the invention. They would have in this respect an extremely fine particle size and a low or zero active particle size fraction Gr and would have therefore an active surface S less than 100 $m^2/g$.

The process of the invention can be implemented by adding the precipitated silica and/or the silica gel to the raw materials or to the slip.

The first possible embodiment of the process involves mixing the precipitated silica and/or the silica gel with the raw materials upstream of the whole production cycle. In this case, as the silicas undergo a process of grinding together with the raw materials with which they are mixed, the initial particle size of the silicas can be totally or partially greater than 60 micron and the active surface S can initially be less than 100 $m^2/g$ Grinding does not significantly influence the surface area of the silicas, though strongly influences their particle size distribution: during grinding, particle size is reduced and the active particle size fraction Gr is increased. In this way the value of the active surface S becomes $\geqq 100$ $m^2/g$ at the moment of treating the additive-containing material with the colorant solutions.

A second embodiment of the process of the invention involves mixing the precipitated silica and/or the silica gel with the slip leaving the mills. In this case the silicas do not undergo further grinding processes; for this reason the active surface S of the precipitated silica and/or the silica gel added to the slip must already be $\geqq 100$ $m^2/g$ at the moment it is added to the mix. This means that the initial particle size of the silicas must be characterised by a particle size fraction Gr already within the optimum interval.

To implement the process of the invention, the precipitated silica and/or silica gel are added to the ceramic mix in a total quantity between 1% and 15% by weight, preferably between 2% and 10% by weight, more preferably between 3% and 7% by weight, of dry silica with respect to the dry ceramic mix.

Adding an additive to a ceramic mix must influence as little as possible either the technical characteristics of the finished product (tile), or the technical characteristics of the mix itself, in particular its processability (given for example by viscosity, density etc); addition of precipitated and/or silica gel in percentages exceeding 15% by weight allows the process of the invention to be implemented equally, but presents disadvantages which make the invention impossible to apply on industrial scale. For example, the ultimate tensile strength of unfired tiles decreases drastically which makes it impossible to automatically decorate additive-containing ceramic material, and at the same time shrinkage during firing increases, compromising the flatness of the tiles. Preferably, the total quantity of silica added to the ceramic mix is between 2% and 10% by weight, even more preferably between 3% and 7% by weight of dry silica with respect to the dry ceramic mix. Adding silica according to the invention to a mix of traditional composition can necessitate a reformulation of the mix itself by suitably modifying the weight composition of the raw materials, or by adding additives known to the expert in the art, such as deflocculants (i.e. tripolyphosphates, polyacrylates, silicates, etc. or their mixtures) and binders (polyacrylates), with the aim of maintaining the technical characteristics of the finished product (ultimate tensile strength, shrinkage, flatness, stain resistance) within standard values. Excess of tripolyphosphate can reduce the result, and therefore mixtures of sodium silicate/sodium polyacrylates, or other deflocculants, are preferred.

In case that the ceramic article be manufactured from a plurality of different is ceramic mixes subject to none or only partial homogenization among each other (according to the so-called "maimiscelati"-technique consisting in the loading to the mould of different ceramic mixes which are not or only incompletely mixed among each other, such as to retain volume elements displaying the same or substantially the same composition as the constituent mixes), at least one of the individual mixes employed should comprise the precipitated silica and/or silica gel according to the invention in a quantity between 1% and 15% by weight, preferably between 2% and 10% by weight, more preferably between 3% and 7% by weight. It is immediately apparent, that in this case, the desired colour will be developed, in interaction with the external application pattern of the iron-based colouring solution, only in surface layers of the ceramic article exposed by homogenous volume elements existing within the overall ceramic body and comprising the precipitated silica and/or silica gel according to the invention at least in the required quantities.

In order to carry out the colouring process of the invention, the ceramic materials to which precipitated silica and/or silica gel has been added are treated with solutions comprising iron, in particular with aqueous or organic solutions of inorganic salts of Fe(II) and/or Fe (III), or organic derivatives of Fe(II) and/or Fe(III). Aqueous colorant solutions containing from 0.1% to 20% by weight of iron (expressed as elemental Fe) are particularly preferred for implementing the process of the invention. The inorganic salts (comprising inorganic complex salts) of Fe(II) usable for implementing the invention are inorganic salts soluble in water or which can be rendered soluble in water by reaction with mineral acids. Particularly preferred are aqueous colorant solutions containing iron (II) ammonium sulphate, iron (II) sulphate, iron (II) chloride, iron (II) perchlorate, potassium hexacyanoferrate (II), ammonium hexacyanoferrate (II). Among the inorganic salts of Fe(III) (comprising inorganic complex salts of Fe(III)) usable for implementing the invention, which are likewise soluble in water or can be rendered so, there is potassium hexacyanoferrate (III).

The organic derivatives of Fe(II) and/or Fe(II) are preferably salts and/or complexes of Fe (II) and/or Fe(III) with organic compounds chosen from the group: acetylacetone; ascorbic acid;

carboxylic acids of general formula $R_1$—COOH and/or a sodium, potassium or ammonium salt thereof in which $R_1$ represents hydrogen, a benzene ring or a C1-C9 alkyl or alkenyl group possibly substituted with from 1 to 6 —COOH, —OH, $NH_2$ and/or —SH groups;

amino acids of general formula

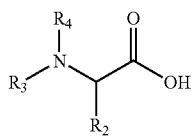

and/or a sodium, potassium or ammonium salt thereof, where $R_2$=—H, —$CH_3$,

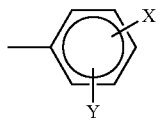

in which X=—H, —$CH_3$ and Y=—H, —OH where $R_3$ and $R_4$ can be equal or different among each other and represent hydrogen, a C1-C4 alkyl group possibly substituted with —OH groups, —$(CH_2)_n$—COOH where n=1-3, —$(CH_2)_m$—$NH_{(2-k)}$—$(CHR_5$—$COOH)_k$ in which m=1-6 and k=1 or 2, and where $R_5$=—H, —$CH_3$,

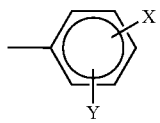

in which X=—H, —$CH_3$ and Y=—H, —OH.

Said salts and/or organic complexes are available commercially or can be easily prepared by the expert in the art by reacting an inorganic iron salt and the corresponding acid or carboxylate; their solubility in water can be increased by partially salifying the acid functions with ammonia, KOH or NaOH or the amino functions with acids. The aqueous solutions of organic derivatives of Fe(II) and/or Fe(III) thus obtained can be used as such, as colorant solutions.

Non-limiting examples of colorant solutions usable for implementing the invention are aqueous solutions of salts and/or organic complexes of Fe(II) and/or Fe(III) with formic, acetic, propionic, butyric, lactic, glycolic, oxalic, tartaric, citric, maleic, fumaric, citraconic, gluconic, aminoadipic, aminobutyric, aminocapronic, aminocaprylic, 2-amino-4-hydroxy butyric, amino isobutyric, levulinic, thioglycolic, salicylic acids, glycine, ethylenediaminetetraacetic acid (EDTA), 1,3-propylenediaminetetraacetic acid, ethylenediamine-N,N'-bis(2-hydroxyphenylacetic) acid (EDDHA), ethylenediamine-N,N'-bis(2-hydroxy 4-methylphenylacetic) acid (EDDHMA), diethylenetriaminepentaacetic acid (DTPA), hydroxyethylenediaminetriacetic acid (HEDTA), nitrilotriacetic acid.

In a particularly preferred embodiment of the process in accordance with the invention, an aqueous solution of iron ammonium citrate containing from 0.3 to 20% by weight of iron (expressed as elemental Fe) is used for colouring the additive-containing ceramic material. Even more preferably an aqueous solution of iron ammonium citrate containing from 1 to 20% by weight of iron (expressed as elemental Fe) is used.

The aqueous colorant solutions usable for carrying out the process in accordance with the invention can also comprise, to modify physical features like density, moistening power, pH, adsorbance by supports, viscosity and others, one or more appropriate modifiers of the aforementioned features, like acids or bases, surfactants, etc. and also, importantly, one or more water miscible solvents like: water-soluble alcohols, propylene glycols, ethylene glycols, glycolic ethers, etc.

The characteristic of the invention, i.e. an increase in delta a* and a reduction in delta L*, bearing in mind that red is one of the fundamental colours, is also extremely useful for obtaining interesting chromatic variations of the currently available colours. Consequently, the colouring solutions containing iron, in particular the aqueous or organic solutions comprising iron in the form of inorganic salts of Fe(II) and/or Fe (III), or organic derivatives of Fe(II) and/or Fe (III) usable to implement the invention can also comprise other chromophore metal ions, in the form of inorganic salts and/or organic derivatives of chromphore metals, chosen from main group metals as well as from transition metals and lanthanides/actinides, preferably chosen from the group: Co, Ni, Cr, Ru, Au, Mn, Ti, Zn, Zr, Sb, V, W, Pd or their mixtures. Said colorant solutions contain 0.1-18.2%, preferably 0.3%-18.2% by weight of iron (expressed as elemental Fe), with a maximum cation concentration of 20%, preferably 19.5%, and a Fe/Me ratio between 15/1 and 1/5, preferably between 13.9/1 and 1/5.

The colouring process of the ceramic materials in accordance with the invention involves the following operative steps:

(a) adding precipitated silica and/or silica gel according to the invention to the ceramic mix to be moulded in a quantity between 1% and 15% by weight, preferably between 2% and 10% by weight, more preferably between 3% and 7% by weight of dry silica with respect to the dry ceramic mix;

(b) moulding the ceramic mix;

(c) drying the moulded ceramic material;

(d) treating the ceramic material derived from the preceding step with at least 2 g/m², preferably at least 10 g/m², of colorant solution;

(e) drying the ceramic material derived from the preceding step;

(f) firing the ceramic material.

The process of the invention is particularly suitable for colouring ceramic material destined for smoothing, preferably porcelain stoneware.

Step (a) is achieved by adding silica either to the ceramic raw materials prior to grinding or to the slip resulting from the grinding, where after the thus obtained slip is atomized in powder form to allow its subsequent moulding.

Step (b) is carried out on the atomizate obtained according to step (a), using pressing techniques for ceramic materials currently in use (single, double or multiple loading). Or, in the case of extruded material, step (b) is carded out extruding a wet paste.

Step (c) is normally conducted at temperatures of about 100°-120° C. and acts to reduce the water content of the ceramic material below the critical level imposed by the rapid firing cycles characteristic of modern ceramics plants. This critical level varies according to the ceramic material and the relative firing cycle; by way of example, the residual water content of a porcelain stoneware tile after drying is generally less than 0.5%.

One or more intermediate steps (c') of pre-treating the dried ceramic material can be optionally undertaken between step (c) and step (d), using water or aqueous solutions of mono- or poly-carboxylic acids or of their salts. Preferably, said mono- or poly-carboxylic acids contain from 1 to 10 carbon atoms, with possibly from 1 to 5 hydroxy, amino or thio substituents in the aliphatic chain, possibly partially or completely salified with ammonium, amines and/or alkali metals and/or alkaline earth metals. Up to 300 g/m$^2$ of pre-treatment solution are normally applied. Preferably the pre-treatment is achieved by disc or spray applications.

Treatment of the ceramic material as described in step (d) takes place by techniques of application known to the expert in the art: painting, spraying, disc spraying, flat or rotating silk-screen printing, printing with silicone cylinders, digital printing with drop-on-demand inking system, or magnetic deflexion, in order to form designs and decorations which completely or partially cover the treated ceramic surface.

According to the application technique used, the colorant solutions must be of differing viscosities at the time of use; for this reason, the colorant solutions are normally thickened into a paste with suitable thickeners, generally natural gums or starches, or well-known inorganic thickeners. E.g., among the former inorganic thickeners, also the very ceramic mix actually employed, suspended in appropriate amounts to modify the colorant solution's viscosity to the desired degree, may be employed. Treatment with colorant solutions at step (d) can be achieved by means of one or more successive applications; between two successive applications the material being decorated could be left to dry for a variable time period.

Colorant solutions suitable for digital printing can be totally or partially water based, as the aqueous colorant solutions already described above which may comprise water-miscible solvents, or they can be totally organic based, depending on ink-jet head characteristics: if the head can't use conductive liquid, the iron-based colorant solutions employed by the present invention have to be formulated using known iron derivatives suitable for the use in non-aqueous liquids like e.g. iron octanoate in aromatic hydrocarbon solvent, as described e.g. in WO 01/51573 incorporated herein by reference, or other organic iron derivatives in suitable organic solvents. Like the aqueous colorant solutions, also the organic colorant solutions, should contain 0.1% to 20%, preferably 0.3% to 20%, more preferably 1% to 20%, most preferably 1% to 10% by weight of iron, (expressed as elemental Fe).

Optionally the decorated ceramic material can be post-treated by way of one or more intermediate steps (d') between step (d) and step (e), with water or aqueous solutions of mono- or poly-carboxylic acids or of their salts. Preferably, said mono- or poly-carboxylic acids contain from 1 to 10 carbon atoms, with possibly from 1 to 5 hydroxy, amino or thio substituents in the aliphatic chain, possibly partially or completely salified with ammonium, amines and/or alkali metals and/or alkaline-earth metals, generally up to a maximum quantity of post-treatment solution of 300 g/m$^2$. The post-treatment solutions can also additionally or exclusively contain inorganic salts like the chloride or fluoride of sodium, potassium or ammonium. Preferably the post-treatment is achieved by disc or spray applications or by screen applications using suitable screens to deposit the wished quantity.

The object of drying step (e) is to even out absorption of the colorant solution and can be achieved at temperatures between ambient temperature, with lengthy balancing periods (about 8 hours), or at temperatures of about 60-70° C., for shorter balancing periods (about 60 minutes).

The firing cycle in step (f) depends on the type of material treated; in the case of porcelain stoneware, a standard firing cycle has a duration of 45-65 minutes (from cold to cold) and a maximum firing temperature of 1200-1220° C.

The process of the invention enables varying of the chromatic yield of the colorant solutions to be obtained, on the surface and/or the interior of the decorated ceramic material, for the depth necessary to allow any subsequent machining. Based on the application technique used, the depth can be regulated by adjusting the viscosity of the solution, the amount of iron applied which in turn is related to the quantity deposited and the iron concentration, and on the numbers of pre- and post-treatments undertaken. Penetration depth can reach even 4 mm. The decorated ceramic materials can therefore be subjected, after firing, to subsequent machining by means of satinizing, smoothing, polishing or lapping, according to the aesthetic effect desired, by removing material from the surface to a depth generally exceeding 50 μm. In any event, the depth of penetration is such that even up to 3 mm of material can be removed by machining, this being important particularly on large-dimension tiles (up to a meter square), should a possible curvature occurring during firing result in considerable deviations in flatness at points distant from the centre of the curve, hence requiring machining to a large depth in order to restore flatness.

As apparent from the above, on top of the new brownish-red colour uniquely provided by the present invention, it is a marked advantage of the present invention that it achieves its aims through the use of the herein described specific types of silicas as additives to the ceramic mass, which are additives influencing as little as possible either the technical characteristics of the finished product (tile), or the technical characteristics of the mix itself, in particular its processability (given for example by viscosity, density etc.).

In contrast thereto, the addition of conventional additives like ZnO and Zn silicate to the ceramic mass exerted a pronounced melting action on the mixture (thus leading to the formation of extended glass phases, compulsory, on the one hand, for the development of colour, but bringing about, on the other hand, molten materials, partially loosing their shape upon firing).

Such melting action gave problems, in the case of e.g. tiles, since, without any counter-measures taken, it reduced considerably the planarity of the tiles resulting from the firing of ZnO or Zn silicate-doped green bodies, in particular the larger the green bodies' dimensions were. While the melting action could be balanced, to some extent, through the addition of refractory materials, it is evident that the more additions were made, the more it became difficult to fully re-store the original performance of the ceramic mass. In practice, adding refractory materials did not only entail additional expenses and specific adaptations, but it was also particularly laborious and could be almost never carried out in advance, as the extent of necessary balancing depended on the dimensions of the ceramic articles to be finally obtained.

It is therefore a merit of the present invention to have overcome the previous necessity of relying on the formation of glass phases within the ceramic material to develop the desired colours. It is a further merit of the present invention to have obtained a substantially contiguous colour range to the one obtainable with the method of WO 02/10092, importantly comprising new colours, as the brownish-red ones. On top of that, it is an advantageous feature of the present invention to have shifted iron chromatic footprint toward dark, pronounced red hues, particularly adapted for the mixing with additional chromophores.

The diversity in the mechanism of colour formation between the method of WO 02/10092 and the present invention becomes evident already from the respective shifts in delta L* values obtained, which are diametrically opposite: Whereas with the present invention positive delta a* values and negative delta L* values are obtained, the method of WO 02/10092 gives (always with positive delta a* values) positive delta L* values. It is also noted that the present invention gives, generally spoken, smaller L* values than WO 02/10092, which means that the colours of the inventions are darker than the comparatively light and clear ones of the prior art Moreover—always with respect to the difference in mechanism of colour formation—whereas, in the present invention, discrete microparticles of the desired colour form within the ceramic mass, which can be resolved under defined conditions of optical observation, no formation of discrete coloured particles is observed according to WO 02/10092, where the colouring arises, instead, from the formation of extended coloured glass phases, brought about by the fusibility enhancement exerted by ZnO and/or Zn silicate.

Preferred but non-exclusive embodiments of the present invention are set out in the following examples. These and further embodiments of the present invention are encompassed by the appended claims and by any combination of the said claims among each other.

EXAMPLES

All the following examples were implemented by adding the silicas to an atomized porcelain stoneware powder supplied by ARKIM S.p.A., of the Cooperativa Ceramica d'Imola S.p.A group, whose composition by weight of oxides before addition of additive is the following:

| $SiO_2$ | $Al_2O_3$ | $Fe_2O_3$ | $TiO_2$ | CaO |
|---|---|---|---|---|
| 68-69% | 18-19% | 0.4-0.5% | 0.35-0.45% | 0.35-0.45% |
| $Na_2O$ | $K_2O$ | MgO | $ZrO_2$ | Firing loss |
| 4.0-4.5 | 1.4-1.5% | 0.05-0.1% | 4.5-5.0% | 2.0-2.5% |

The powder was prepared atomizing a slip fluidified with a mixture of sodium silicate and sodium polyacrylate.

The samples and tiles were fired in an industrial kiln with a porcelain stoneware firing cycle of 60 minutes (from cold to cold) at a maximum temperature of 1200° C. Some samples and tiles were smoothed using diamond wheels to a depth of about 0.6 mm. The colour measurements were carried out in accordance with the L*a*b* system, using a Dr. Lange colorimeter, Spectrapen Model (LZM224—Standard N0.1009). The particle size of the silicas was measured by dispersing 0.1 g of silica in distilled water containing 0.05% surfactant (sodium hexametaphosphate or sodium pyrophosphate). The samples were analysed with a Malvern 2000 particle size analyser after having been subjected to ultrasound treatment at maximum power for times varying between 1 and 30 minutes, depending on the initial aggregation state of the sample. Surface area measurements, by the B.E.T. method, were obtained using a Micromeritics ASAP2010 nitrogen porosimeter used on the silicas as such. All the delta E values which follow refer to the difference in resultant colour between colorant solutions applied to the additive-containing mix and those applied to the additive-free mix.

Examples 1-5

100 g of atomized ceramic mix were dispersed in water (water mix ratio=1:2). 5% by weight, with respect to the dry ceramic mix, of each silica was added under agitation to the slip obtained. The ceramic mix with additive was dried in an oven at 100° C. until its weight was constant, then crumbled (zero residue on 1 mm mesh sieve), rehydrated to a water content of 5% and pressed into test samples of dimensions 110×55 mm. The ceramic material formed was dried in an oven at 100° C. until a residual water content less than 0.5% was obtained. Characteristics of the silicas used:

| Example No | TRADE NAME | TYPE of silica | Gr (%) | A ($m^2/g$) | S ($m^2/g$) |
|---|---|---|---|---|---|
| 1 | Ultrasil VN3 - Degussa | Ppt | 83.36 | 168.1 | 140.1 |
| 2 | Sipernat 700 - Degussa | Ppt | 79.61 | 689.6 | 542.1 |
| 3 | Wide pore Silica - Meigao Chemical | Gel | 91.86 | 283.7 | 260.6 |
| 4 | Daisogel SP60-3P - Daiso Corp. | Gel | 100.00 | 434 | 434.0 |
| 5 | Daisogel SP200-15P - Daiso Corp. | Gel | 89.94 | 189 | 170.0 |

The Examples were implemented by applying 1 drop (weight: 0.047±0.005 g, average diameter of colour spot formed: 1.3 cm) of aqueous iron ammonium citrate colorant solution containing 1% of Fe by weight onto those test samples intended to remain in the rough state, and containing 2.5% of Fe by weight onto those test samples intended to be smoothed. The colorant solutions were obtained by dissolving iron ammonium citrate containing 28% of Fe by weight in an aqueous 10 wt % triammonium citrate solution.

| Example No. | ROUGH | | | | SMOOTHED | | | |
|---|---|---|---|---|---|---|---|---|
| | L | a* | b* | ΔE | L | a* | B* | ΔE |
| 1 | 65.34 | 11.06 | 18.61 | 10.47 | 71.98 | 7.25 | 10.45 | 10.64 |
| 2 | 61.90 | 13.45 | 15.29 | 14.56 | 67.81 | 10.53 | 11.17 | 15.96 |
| 3 | 61.04 | 16.15 | 17.25 | 17.25 | 66.11 | 10.30 | 12.32 | 17.45 |
| 4 | 58.35 | 16.76 | 24.61 | 20.86 | 64.37 | 8.67 | 16.56 | 19.45 |
| 5 | 59.55 | 18.06 | 16.04 | 19.28 | 63.96 | 12.60 | 12.90 | 20.52 |
| Additive-free STANDARD | 73.48 | 4.75 | 16.74 | | 81.10 | 1.90 | 9.30 | |

Examples 6-11

Comparative

Test samples of mix for porcelain stoneware were prepared as described in Examples 1-5, adding to the atomized ceramic mix silicas with the following characteristics:

| Example No. | TRADE NAME | TYPE of silica | Gr (%) | A (m²/g) | S (m²/g) |
|---|---|---|---|---|---|
| 6 | Sident 9 - Degussa | Precipitated | 74.64 | 45.2 | 33.7 |
| 7 | Sipernat 320DS - Degussa | Precipitated | 54.22 | 142.1 | 77.0 |
| 8 | Shree K - Shree Chem. Ind. | Precipitated | 87.08 | 96.0 | 83.6 |
| 9 | Ludox TM50 - Grace Davison | Colloid | 0 | 140 | 0 |
| 10 | Quartz - Sibelco | Quartz | 92.11 | 1.5 | 1.4 |
| 11 | Davisil 634 - Grace | Gel | 6.77 | 462.4 | 31.3 |

The Examples were implemented by applying 1 drop (weight: 0.047±0.005 g, average diameter of colour spot formed: 1.3 cm) of aqueous iron ammonium citrate colorant solution as in Examples 1-5.

| Example No. | ROUGH | | | | SMOOTHED | | | |
|---|---|---|---|---|---|---|---|---|
| | L | A* | B* | ΔE | L | a* | B* | ΔE |
| 6 | 75.26 | 4.03 | 17.35 | 2.01 | 82.47 | 0.84 | 7.25 | 2.68 |
| 7 | 71.92 | 6.86 | 21.63 | 5.55 | 80.40 | 1.64 | 9.05 | 0.79 |
| 8 | 72.45 | 6.44 | 20.64 | 4.37 | 79.94 | 1.88 | 9.25 | 1.16 |
| 9 | 73.90 | 4.66 | 15.86 | 0.98 | 78.42 | 2.07 | 9.72 | 2.72 |
| 10 | 75.06 | 3.49 | 15.85 | 2.21 | 80.50 | 1.61 | 9.14 | 0.69 |
| 11 | / | / | / | (*) | / | / | / | (*) |
| Additive-free STANDARD | 73.48 | 4.75 | 16.74 | | 81.10 | 1.90 | 9.30 | |

(*) Dotted surface whose measurement of L*a*b* values is not indicative, the dots having been brought about by excessive dimensions of the silica particles employed.

Examples 12-14

33×33 cm tiles were prepared and coloured in accordance with the following process:

(a) 5% by weight of Wide Pore Silica silica gel from Meigao Chemicals (Gr=91.86%; A=283.7 m²/g, S=260.6 m²/g) was added to the porcelain stoneware mix slip and the additive-containing mix was atomized to obtain a powder;

(b) the powder mix with silica additive was formed into tiles 33×33 cm in size;

(c) the tiles were dried in a dryer at a maximum temperature of 1200° C. with a drying cycle of about 60 minutes;

(d) aqueous colorant solutions at various Fe concentrations in the form of iron ammonium citrates thickened to the correct viscosity by adding modified starch for use with 36 or 90 wire screens, were applied to the ceramic material formed, using silk-screen printing;

(d') the ceramic material was post-treated with an 8% aqueous solution of sodium 2-hydroxy 1,2,3-trihydroxycarbonyl propane at 220 g/m²;

(e) the decorated ceramic material was dried at ambient temperature for about 6 hours;

(f) the tiles were fired in an industrial kiln with a 60 minute firing cycle (from cold to cold) and a maximum temperature of 1200° C.

After firing the tiles were smoothed to a depth of about 0.6 mm.

| Example no. | % Fe | No. Wires* | ADDITIVE-CONTAINING MIX | | | STANDARD | | | |
|---|---|---|---|---|---|---|---|---|---|
| | | | L | a* | b* | L | a* | b* | ΔE |
| 12 | 10 | 36 | 56.82 | 16.08 | 15.17 | 76.21 | 1.92 | 11.47 | 24.29 |
| 13 | 14 | 90 | 53.36 | 16.51 | 14.53 | 76.79 | 1.46 | 9.97 | 28.22 |
| 14 | 20 | 90 | 46.08 | 16.35 | 15.63 | 76.14 | 1.29 | 10.06 | 34.08 |

*the 36 and 90 wire screens deposit 64.8 and 29.6 cc/sq. metre respectively

Examples 15-25

Various Derivatives of Iron II and III

The mix with silica added as described in Examples 1-5 was formed into tiles of dimensions 33×33 cm on which were applied 2 drops (total average weight: 0.094±0.005 g, average diameter of colour spot formed: 1.8 cm) of each colorant solution. Colorant solutions containing 1.0% of iron by weight (expressed as elemental Fe) were applied to tiles intended to remain rough, while solutions containing 2.5% of iron were applied to the tiles intended for smoothing. Subsequently the tiles were fired in an industrial kiln and smoothed. Characteristics of the silicas added to the mix:

Commercial name: Wide Pore Silica—Meigao Chemicals, Gr=91.86%; A=283.7 m²/g; S=260.6 m²/g (as in previous example 3).

Colorant Solutions Used:

| Example No. | |
|---|---|
| 15 | Potassium hexacyanoferrate (II) |
| 15bis | Potassium hexacyanoferrate (III) |
| 16 | Iron (II) ammonium sulfate |
| 17 | Iron (II) chloride |
| 18 | Iron (II) sulfate |
| 19 | Iron (III) citrate |
| 20 | Iron (III) ammonium oxalate |
| 21 | disodium iron (III) pentetate ("Aldrich 27459-5G: diethylenetriamine pentacetic acid iron (III) disodium salt dihydrate 98%") |

-continued

| | |
|---|---|
| 22 | Iron (II) ascorbate |
| 23 | Iron ammonium complex of ethylenediaminetetracetic acid |
| 24 | Iron (II) gluconate: The aqueous colorant solution was obtained by adding a 30% aqueous solution of $NH_4OH$ to iron (II) gluconate until the compound was dissolved. |
| 25 | Iron glycinate hydrochloride: The aqueous colorant solution was prepared by reacting $FeCl_2 \cdot 4H_2O$ with glycine. |

| Example no. | ROUGH ΔE | SMOOTHED ΔE |
|---|---|---|
| 15 | 22.87 | 17.71 |
| 15bis | 20.73 | 16.62 |
| 16 | 20.01 | 20.61 |
| 17 | 13.79 | 18.96 |
| 18 | 14.98 | 18.84 |
| 19 | 22.28 | 17.22 |
| 20 | 18.98 | 17.24 |
| 21 | 18.46 | 21.07 |
| 22 | 15.26 | 24.28 |
| 23 | 18.91 | 22.28 |
| 24 | 23.10 | 25.26 |
| 25 | 19.64 | 13.56 |

Examples 26-47

Onto 33×33 cm tiles prepared as described in Examples 15-25 were applied 2 drops (total weight: 0.110±0.005 g, average diameter of colour spot formed: 1.6 cm) of each aqueous colorant solution containing Fe—in the form of iron ammonium citrate—and other chromophore metals in the form of the following salts and/or complexes: manganese ammonium citrate, zinc ammonium citrate, cobalt ammonium citrate, vanadium ammonium citrate, zirconium ammonium carbonate, ruthenium glycolate, titanium ammonium lactate, chromium ammonium citrate, nickel ammonium citrate, gold acetylcysteinate. Where not expressively indicated, smoothing was 0.6-0.8 mm.

| Example No. | Me | Fe/Me | % element by weight | ROUGH ΔE | SMOOTHED ΔE |
|---|---|---|---|---|---|
| 26 | Mn | 1/1.4 | Fe 1.25/Mn 1.69 | 23.70 | 11.89 |
| 27 | Mn | 6.7/1 | Fe 3.75/Mn 0.56 | 13.60 | 19.27 |
| 28 | Zn | 1/3.6 | Fe 1.25/Zn 4.50 | 15.19 | 15.53 |
| 29 | Co | 3.9/1 | Fe 1.88/Co 0.48 | 15.16 | 14.99 |
| 30 | V | 1/3 | Fe 1.25/V 3 | 13.20 | 10.14 |
| 31 | V | 3.8/1 | Fe 1.88/V 0.50 | 20.34 | 13.66 |
| 32 | Zr | 1/3.3 | Fe 0.75/Zr 2.48 | 19.50 | 11.02 |
| 33 | Zr | 1/1.4 | Fe 2.50/Zr 3.55 | 12.57 | 28.08 |
| 34 | Ru | 5.0/1 | Fe 1.88/Ru 0.38 | 12.99 | 9.14 |
| 35 | Ti | 1.2/1 | Fe 2.50/Ti 2.00 | 9.70 | 6.47 |
| 36 | Ni | 1.39/1 | Fe 1.25/Ni 0.95 | 7.57 | 9.05 |
| 37 | Au | 10/1 | Fe 1.25/Au 0.12 | 9.27 | 8.54 |
| 38 | Co, V | 1/3.5 | Fe 0.95/Co 0.53/V 2.60 | 10.10 | 7.86 |
| 39 | Co, Ru | 1/1.16 | Fe 1.10/Co 1.05/Ru 0.225 | 11.32 | 6.66 |
| 40 | Ni, Co | 1.7/1 | Fe 1.25/Ni 0.54/Co 0.22 | 9.01 | 8.05 |
| 41 | Cr, Co | 1.5/1 | Fe 1.25/Cr 0.41/Co 0.38 | 11.89 | 8.33 |
| 42 | Co, Mn, Ru | 1/1.3 | Fe 1.50/Co 0.66/Mn 0.96/Ru 0.30 | 12.48 | 10.39 |
| 43 | Co, Mn, Au | 1.6/1 | Fe 1.02/Co 0.40/Au 0.05/Mn 0.19 | 16.24 | 6.74 |
| 44* | Ru | 10/1 | Fe 0.3/Ru 0.03 | 10.19 | 12.52 |
| 45* | Co | 10/1 | Fe 0.3/Co 0.03 | 6.7 | 13.17 |
| 46* | Zr | 1/5 | Fe 0.3/Zr 1.5 | 13.42 | 7.93 |
| 47* | Zr | 1/5 | Fe 0.5/Zr 2.5 | 23.16 | 14.84 |

*Smoothing variable from 1.8 to 2.2 mm

For greater clarification, the colours and the L*a*b* of tests 26-47 are given below

| Example no. | Me | 1 | 2 | 3 | 4 |
|---|---|---|---|---|---|
| 26 | Mn | Beige | violet grey | light beige | Rose grey |
| 27 | Mn | Brown | dark brown | green beige | Rose brown |
| 28 | Zn | green grey | dove grey | light grey | Beige rose |
| 29 | Co | Grey | dark violet grey | light blue | Grey |
| 30 | V | beige grey | violet grey | Beige | Rose grey |
| 31 | V | green beige | brick red | Beige | Light brick red |

-continued

| | | | | | |
|---|---|---|---|---|---|
| 32 | Zr | Beige | orange rose | Colourless | Flesh pink |
| 33 | Zr | brown yellow | brick red | Light beige grey | Rust |
| 34 | Ru | green grey | brown | Grey | Brown grey |
| 35 | Ti | green yellow | olive green | green beige | Amber |
| 36 | Ni | brown ochre | brown | light beige | Hazel |
| 37 | Au | flesh pink | crimson or brick red | light pink | Brick rose |
| 38 | Co, V | Grey | dark grey | light grey | Rose grey |
| 39 | Co, Ru | blue grey | dark grey | blue grey | Grey |
| 40 | Ni, Co | Military green | dark brown | light grey | Hazel |
| 41 | Cr, Co | Military green | dark grey | green grey | Grey |
| 42 | Co, Mn, Ru | Blue grey | dark grey | Grey | Dark grey |
| 43 | Co, Mn, Au | Grey | dark grey | light grey | Grey |
| 44 | Ru | light greyish | almost absent | grey rose | Pink grey |
| 45 | Co | very light grey | absent | rose grey | Flesh pink |
| 46 | Zr | very light beige | absent | dark rose | Light rose |
| 47 | Zr | Beige | absent | dark rose | Deep rose |

| Example | | 1 | | | 2 | | | 3 | | | 4 | | |
|---|---|---|---|---|---|---|---|---|---|---|---|---|---|
| no. | Me | L | A | B | L | a | b | L | a | B | L | a | b |
| 26 | Mn | 72.05 | 2.56 | 13.94 | 50.35 | 4.06 | 4.53 | 78.32 | 1.61 | 10.54 | 67.13 | 5.47 | 9.37 |
| 27 | Mn | 44.56 | 4.96 | 6.91 | 43.96 | 12.91 | 17.94 | 72.17 | 2.88 | 14.55 | 54.06 | 8.03 | 10.46 |
| 28 | Zn | 74.27 | 1.47 | 12.57 | 59.23 | 3.49 | 11.96 | 78.68 | 1.31 | 9.10 | 65.26 | 7.73 | 13.55 |
| 29 | Co | 58.72 | −0.87 | 7.47 | 44.79 | 1.03 | 1.81 | 78.51 | −0.07 | 4.96 | 64.09 | 2.99 | 7.66 |
| 30 | V | 69.70 | 2.61 | 10.48 | 57.35 | 6.46 | 7.85 | 76.51 | 2.38 | 10.53 | 67.84 | 7.33 | 12.32 |
| 31 | V | 70.55 | 3.75 | 16.13 | 53.28 | 14.35 | 14.32 | 79.23 | 1.92 | 10.34 | 69.26 | 9.55 | 15.71 |
| 32 | Zr | 78.54 | 1.70 | 12.53 | 63.93 | 13.6 | 17.54 | 82.48 | 1.01 | 7.27 | 74.71 | 6.3 | 13.02 |
| 33 | Zr | 63.25 | 8.00 | 20.41 | 54.81 | 12.58 | 12.3 | 79.49 | 1.38 | 9.33 | 56.21 | 14.8 | 11.47 |
| 34 | Ru | 59.14 | 1.41 | 11.85 | 47.73 | 6.96 | 9.06 | 68.20 | 0.72 | 7.59 | 60.66 | 3.45 | 11.98 |
| 35 | Ti | 63.53 | 4.73 | 26.61 | 56.93 | 5.67 | 19.57 | 74.37 | 1.50 | 13.66 | 71.55 | 3.92 | 18.96 |
| 36 | Ni | 53.51 | 7.84 | 19.1 | 48.64 | 8.59 | 13.36 | 77.17 | 2.34 | 10.11 | 69.33 | 5.15 | 13.65 |
| 37 | Au | 62.45 | 8.24 | 10.16 | 55.45 | 13.62 | 12.99 | 78.62 | 2.50 | 7.14 | 73.02 | 7.26 | 11.49 |
| 38 | Co, V | 63.84 | −0.77 | 3.48 | 53.87 | 0.29 | 2.28 | 71.52 | −0.15 | 5.17 | 63.97 | 1.95 | 5.80 |
| 39 | Co, Ru | 53.10 | −4.36 | −1.55 | 42.45 | −0.71 | −0.37 | 65.67 | −1.06 | 3.57 | 59.13 | −0.22 | 4.50 |
| 40 | Ni, Co | 55.25 | 2.04 | 13.69 | 48.35 | 4.34 | 8.38 | 78.36 | 1.01 | 6.94 | 71.01 | 2.83 | 9.67 |
| 41 | Cr, Co | 58.33 | 1.72 | 11.21 | 47.97 | 2.44 | 5.41 | 77.60 | 0.44 | 8.28 | 69.66 | 2.44 | 9.82 |
| 42 | Co, Mn, Ru | 56.49 | −2.34 | 2.24 | 44.36 | 0.1 | 0.64 | 63.06 | −0.79 | 5.10 | 52.88 | 1.31 | 5.15 |
| 43 | Co, Mn, Au | 64.90 | −0.11 | 3.19 | 48.81 | 1.79 | 2.03 | 78.03 | 0.67 | 5.57 | 71.59 | 2.38 | 6.56 |
| 44 | Ru | 80.63 | 0.73 | 10.63 | 74.66 | 6.02 | 16.97 | 79.91 | 1.23 | 9.15 | 71.15 | 6.32 | 16.5 |
| 45 | Co | 80.54 | 0.58 | 8.73 | 74.51 | 2.64 | 10.82 | 82.32 | 1.12 | 7.37 | 73.73 | 8.47 | 14.13 |
| 46 | Zr | 81.7 | 1.16 | 9.28 | 72.25 | 9.05 | 14.63 | 82.32 | 1.12 | 7.37 | 76.44 | 6.11 | 9.19 |
| 47 | Zr | 80.11 | 1.37 | 10.44 | 61.01 | 13.99 | 13.97 | 82.32 | 1.12 | 7.37 | 71.53 | 9.88 | 12.58 |

1: Colour of additive-free rough support
2: Colour of additive-containing rough support
3: Colour of additive-free smoothed support
4: Colour of additive-containing smoothed support Examples 48-53

Tests with Individual Cations

Using the same procedure as examples 26-47, solutions containing the individual cations without iron were tested to show, by comparing them with the results of mixtures containing iron, the strong influence of the same on chromatic fingerprint. The tiles were smoothed to a depth of 0.3-0.5 mm. Characteristics of the silicas used in the mix: Commercial name: Wide pore Silica—Meigao Chemicals; GR=91.86%; A=283.7 m$^2$/g; S=260.6 m$^2$/g.

| Example No. | Me | % element by weight | ROUGH ΔE | SMOOTHED ΔE |
|---|---|---|---|---|
| 48 | Ru | Ru 0.6 | 3.92 | 2.07 |
| 49 | Cr | Cr 0.8 | 2.56 | 2.28 |
| 50 | Ni | Ni 0.8 | 2.86 | 2.26 |
| 51 | Ni | Ni 1.6 | 1.67 | 4.84 |
| 52 | Fe | Fe 1 | 18.95 | 8.61 |
| 53 | Fe | Fe 2.5 | 17.62 | 29.03 |

Examples 54-58

Tests Using Silk-Screen Application of Mixtures with 90-Wire Screens

Using the same procedure as examples 12-14 some solutions containing iron and other cations were tested. The compounds used to introduce cations other than iron into the solutions are listed in the description of examples 26-47.

| Ex. No. | Me | Fe/Me | % Cations | % Total. Cations | Smoothing depth | ADDITIVE-CONTAINING MIX | | | STANDARD | | | ΔE |
|---|---|---|---|---|---|---|---|---|---|---|---|---|
| | | | | | | L | a* | b* | L | a* | B* | |
| 54 | Zr | 10/1 | Fe 17.62/ Zr 1.76 | 19.38 | 0.3-0.4 | 48.93 | 12.90 | 13.93 | 78 | 1.19 | 9.28 | 31.67 |
| 55 | Zr | 1/5 | Fe 2.58/ Zr 12.89 | 15.47 | 0.3-0.4 | 73.06 | 7.09 | 11.44 | 81.68 | 0.93 | 7.31 | 11.37 |
| 56 | Sb/Cr | 13.9/1 | Fe 18.2/ Sb 1.152/ Cr 0.1584 | 19.5 | 0.3-0.4 | 49.73 | 9.53 | 13.04 | 80.44 | 1.04 | 8.6 | 32.18 |
| 57 | Sb/Cr | 1/3.6 | Fe 3.34/ Sb 10.66/ Cr 1.47 | 15.47 | 0.3-0.4 | 74.55 | 2.05 | 14.6 | 80.08 | 0.91 | 11.43 | 6.48 |
| 58 | Sb | 8.8/1 | Fe 12.74/ Sb 1.44 | 14.18 | 0.6-0.7 | 56.84 | 9.57 | 14.79 | 80.4 | 1.06 | 8.23 | 25.91 |

Example 59

Comparison

To investigate the colour formation according to the present invention and according to WO 02/10092, the chromatic co-ordinates of the examples (smoothed embodiments) quoted in WO 02/10092 were compared to the chromatic co-ordinates of the examples of the present invention (smoothed embodiments) quoted herein above.

In the following tables 59(I) and (II), the respective delta L* values and delta a* values are set out:

TABLE 59(I)

Delta a* and Delta L* values according to the invention (taken from the respective examples above).

| Example | Delta a* | Delta L* |
|---|---|---|
| 1 | 5.35 | −9.1 |
| 2 | 8.63 | −13 |
| 3 | 8.4 | −15 |
| 5 | 10.7 | −17 |
| 12 | 14.2 | −19 |
| 13 | 15.1 | −23 |
| 14 | 15.1 | −30 |
| 15 | 8.08 | −15.04 |
| 15bis | 8.20 | −14.10 |
| 16 | 11.19 | −13.90 |
| 17 | 11.07 | −14.00 |
| 18 | 10.39 | −11.92 |
| 19 | 9.06 | −13.59 |
| 20 | 8.73 | −14.15 |
| 21 | 11.51 | −17.51 |
| 22 | 14.05 | −19.81 |
| 23 | 11.96 | −18.38 |
| 24 | 15.04 | −19.86 |
| 25 | 7.47 | −10.68 |
| 26 | 3.86 | −11.19 |
| 27 | 5.15 | −18.11 |
| 28 | 6.42 | −13.42 |
| 29 | 3.06 | −14.42 |
| 30 | 4.95 | −8.67 |
| 31 | 7.63 | −9.97 |
| 32 | 5.29 | −7.77 |
| 33 | 13.42 | −23.28 |
| 34 | 2.73 | −7.54 |
| 35 | 2.42 | −2.82 |
| 36 | 2.81 | −7.84 |
| 37 | 4.76 | −5.6 |
| 38 | 2.1 | −7.55 |
| 39 | 0.84 | −6.54 |
| 40 | 1.82 | −7.35 |
| 41 | 2 | −7.94 |
| 42 | 2.1 | −10.18 |
| 43 | 1.71 | −6.44 |
| 44 | 5.09 | −8.76 |
| 45 | 7.35 | −8.59 |
| 46 | 4.99 | −5.88 |
| 47 | 8.76 | −10.79 |

TABLE 59(II)

Delta a* and Delta L* according to WO 02/10092 (taken from the respective examples of WO 02/10092 quoted hereinafter):

| Test no. | Traditional mixture Color | L* | A* | B* | Test no. | Mixture with ZnO Color | L* | A* | B* | delta E | delta a* | delta L* |
|---|---|---|---|---|---|---|---|---|---|---|---|---|
| 64 | Beige green | 67.84 | 2.97 | 17.43 | 1 | Pastel pink | 73.50 | 7.53 | 13.68 | 8.18 | 4.56 | 5.66 |
| 65 | Beige | 75.23 | 1.95 | 15.39 | 2 | Soft pink | 80.62 | 5.17 | 11.89 | 7.19 | 3.22 | 5.39 |
| 66 | Beige green | 56.06 | 2.67 | 16.67 | 3 | Flesh pink | 69.63 | 12.15 | 17.36 | 16.57 | 9.48 | 13.57 |
| 67 | Beige green | 63.70 | 3.77 | 18.23 | 4 | Flesh pink | 75.47 | 7.68 | 13.88 | 13.14 | 3.91 | 11.77 |
| 68 | Beige | 73.26 | 2.36 | 16.29 | 7 | Soft pink | 82.23 | 3.84 | 10.33 | 10.87 | 1.48 | 8.97 |
| 69 | Intense beige | 70.07 | 2.89 | 17.36 | 8 | Soft pink | 81.86 | 4.05 | 10.48 | 13.70 | 1.16 | 11.79 |
| 70 | Light beige | 77.44 | 1.59 | 13.99 | 10 | Soft pink | 84.18 | 2.68 | 9.01 | 8.45 | 1.09 | 6.74 |
| 71 | Beige | 76.27 | 1.71 | 14.67 | 11 | Soft pink | 83.56 | 3.01 | 9.38 | 9.10 | 1.30 | 7.29 |
| 72 | Brown | 44.02 | 7.11 | 17.70 | 18 | Orange pink | 59.55 | 13.69 | 24.76 | 18.28 | 6.58 | 15.53 |
| 73 | Beige | 75.49 | 1.78 | 15.03 | 20 | Pale pink | 80.96 | 3.49 | 12.32 | 6.34 | 1.71 | 5.47 |
| 74 | Brown | 44.36 | 7.73 | 17.39 | 21 | Orange pink | 61.30 | 12.71 | 26.12 | 19.70 | 4.98 | 16.94 |
| 75 | Beige | 75.88 | 1.77 | 14.85 | 23 | Pale pink | 81.66 | 2.75 | 11.47 | 6.77 | 0.98 | 5.78 |
| 76 | Brown | 41.70 | 8.67 | 17.15 | 24 | Orange pink | 63.78 | 11.08 | 22.70 | 22.89 | 2.41 | 22.08 |
| 77 | Beige | 75.58 | 1.77 | 14.89 | 26 | Pale pink | 81.96 | 2.39 | 11.12 | 7.44 | 0.62 | 6.38 |

Figure 3:
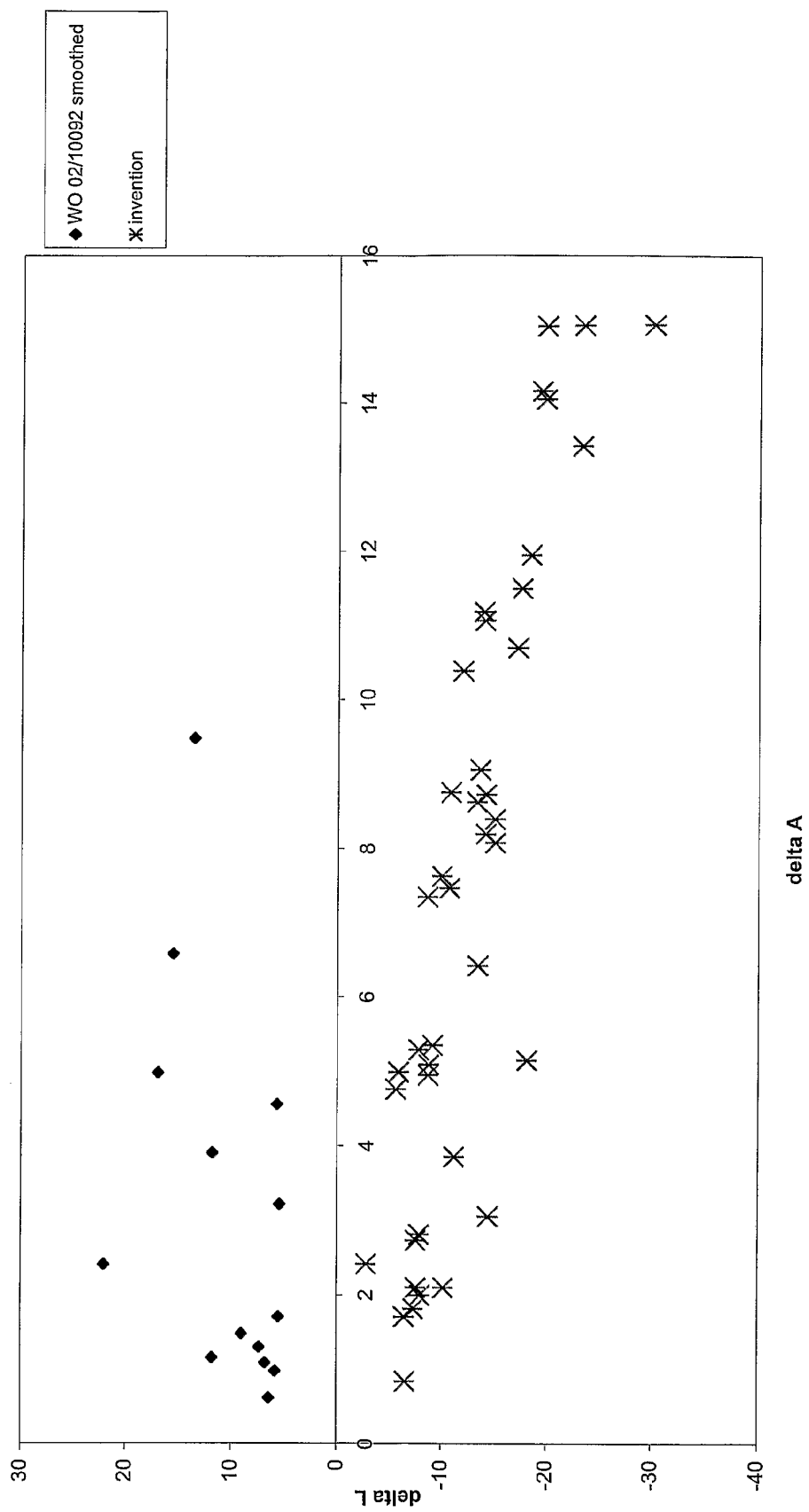
FIG. 3 is a graphic representation of the delta a* values and the delta L* values of the (smoothed) colouring tests reported in table 6 of WO 02/10092, and of examples 1-5, 12-47 reported in the instant Patent Application.

As is apparent from FIG. 3 (which is a graphic representation of the delta L* and delta a* values of the above tables 59(I) and 59(II)), an analysis of the delta L* and delta a* values according to smoothed embodiments obtainable with the prior art and obtainable according to the present invention shows that for the positive delta a* values obtained, i.e. for the required increase in redness, the respective delta L* values obtained according to the present invention are negative, whereas those according to the prior art are positive.

Instead, in the following tables 59(III) and (IV), a comparison of the L*, a*, b* data was made, always among the smoothed embodiments of WO 02/10092 and the smoothed embodiments of the present invention.

TABLE 59(III)

L*a*b* Data according to WO 02/10092 (taken from the respective examples of WO 02/10092 quoted hereinafter):

| Test no. | % Cr | % Zn | % Fe | L* | a* | b* |
|---|---|---|---|---|---|---|
| 12 | 7.92 | | 1.0 | 58.84 | 15.01 | 22.98 |
| 18 | 6.16 | | 3.0 | 59.55 | 13.69 | 24.76 |
| 15 | 7.04 | | 2.0 | 61.07 | 13.21 | 22.41 |
| 21 | 5.28 | | 4.0 | 61.3 | 12.71 | 26.12 |
| 27 | 3.52 | | 6.0 | 63.57 | 10.46 | 25.64 |
| 24 | 4.4 | | 5.0 | 63.78 | 11.08 | 22.7 |
| 3 | 6.16 | 2.4 | | 69.63 | 12.15 | 17.36 |
| 1 | 4.4 | | | 73.5 | 7.53 | 13.68 |
| 13 | 3.96 | | 0.5 | 74.24 | 7.94 | 16.89 |
| 4 | 4.4 | 4.0 | | 75.47 | 7.68 | 13.88 |
| 22 | 2.64 | | 2.0 | 76.42 | 5.36 | 16.13 |
| 16 | 3.52 | | 1.0 | 76.67 | 6.19 | 15.58 |
| 19 | 3.08 | | 1.5 | 76.92 | 5.68 | 15.44 |
| 25 | 2.2 | | 2.5 | 77.93 | 4.28 | 15.2 |
| 28 | 1.76 | | 3.0 | 78.87 | 3.58 | 14.28 |
| 5 | 2.64 | 5.6 | | 79.71 | 5.51 | 12.23 |
| 2 | 2.2 | | | 80.62 | 5.17 | 11.89 |
| 14 | 1.98 | | 0.25 | 80.84 | 4.26 | 12.07 |
| 20 | 1.54 | | 0.75 | 80.96 | 3.49 | 12.32 |
| 17 | 1.76 | | 0.5 | 81.38 | 3.58 | 11.84 |
| 23 | 1.32 | | 1.0 | 81.66 | 2.75 | 11.47 |
| 8 | 3.08 | 1.2 | | 81.86 | 4.05 | 10.48 |
| 26 | 1.1 | | 1.25 | 81.96 | 2.39 | 11.12 |
| 7 | 2.9 | 2.0 | | 82.23 | 3.84 | 10.33 |
| 29 | 0.88 | | 1.5 | 82.35 | 2.1 | 10.8 |
| 11 | 1.54 | 0.6 | | 83.56 | 3.01 | 9.38 |
| 6 | 1.32 | 2.8 | | 83.67 | 3.08 | 9.41 |
| 10 | 1.1 | 1.0 | | 84.18 | 2.68 | 9.01 |
| 9 | 0.66 | 1.4 | | 85.01 | 2.12 | 8.34 |

TABLE 59(IV)

L*a*b* Data according to the present invention (taken from the respective examples above, quoted hereinafter:

| example | % Fe | % silica | Smoothed L* | a* | b* |
|---|---|---|---|---|---|
| 14 | 2.5% | 5% | 46.08 | 16.35 | 15.63 |
| 13 | 2.5% | 5% | 53.36 | 16.51 | 14.53 |
| 12 | 2.5% | 5% | 56.82 | 16.08 | 15.17 |
| 24 | 2.5% | 5% | 57.87 | 16.82 | 16.1 |
| 22 | 2.5% | 5% | 57.99 | 15.9 | 15.16 |
| 21 | 2.5% | 5% | 59.99 | 13.33 | 14.45 |
| 23 | 2.5% | 5% | 60.44 | 13.69 | 14.93 |
| 17 | 2.5% | 5% | 62.3 | 13.09 | 19.09 |
| 5 | 2.5% | 5% | 63.96 | 12.6 | 12.9 |
| 4 | 2.5% | 5% | 64.37 | 8.67 | 16.56 |
| 18 | 2.5% | 5% | 64.89 | 12.29 | 22.65 |
| 16 | 2.5% | 5% | 65.13 | 12.91 | 21.11 |
| 20 | 2.5% | 5% | 65.73 | 10.31 | 14.47 |
| 15 | 2.5% | 5% | 65.83 | 9.64 | 14.03 |
| 25 | 2.5% | 5% | 65.9 | 9.57 | 16.23 |
| 3 | 2.5% | 5% | 66.11 | 10.3 | 12.32 |
| 15bis | 2.5% | 5% | 67.40 | 9.50 | 12.60 |
| 19 | 2.5% | 5% | 67.49 | 10.54 | 14.82 |
| 2 | 2.5% | 5% | 67.81 | 10.53 | 11.17 |
| 1 | 2.5% | 5% | 71.98 | 7.25 | 10.45 |

Figure 4:
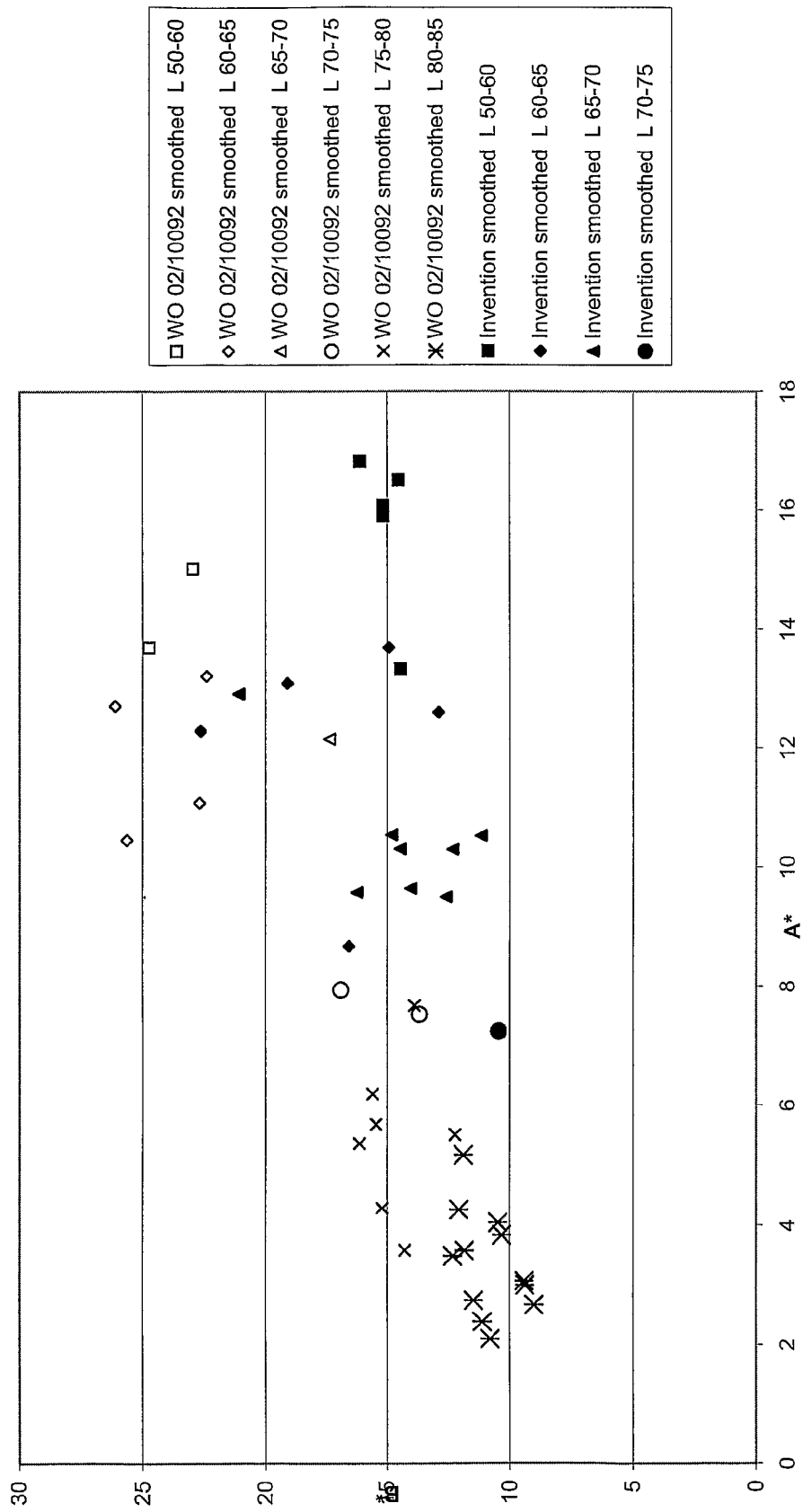
FIG. 4 is a graphic representation of the a* and b* values of the (smoothed) colouring tests reported in table 2 of WO 02/10092, and of examples 1-5, 12-25 reported in the instant Patent Application.

As is apparent from FIG. 4 (which is a graphic representation of the a*, b* and L* values of the above tables 59(III) and 59(IV)), the analysis of the colorimetric data given in the present Application and in the prior art for the smoothed embodiments confirms that the present invention allows for the attainment of new colours in the brownish-red to pinkish-orange range. This is true in particular for heretofore unattainable brownish-red colours which are situated in the lower, right part of the graphic representation of the a* vs. b* diagram (FIG. 4), showing two clouds of points (the one of the prior art and the one of the present invention), situated in contiguous, but nevertheless substantially different zones of the colormetric space. It appears that a virtual line of distinction between the two clouds would run from the lower left, to the upper right (i.e. roughly from (0/0) to (18/30)), thus dividing the more pink tones from the more orange tones.

On top of that, it should be noted that, even if not apparent from the two-dimensional graph of FIG. 4, the L* values obtained according to the present invention are generally lower than those according to the prior art, which means that the two clouds represented in FIG. 4 are situated substantially at different levels with respect to their plane of projection shown in the said FIG. 4.

The generally lower L* values of the present invention mean, seen with the human observer's eye, that the respective colours are darker and more pronounced (i.e. "stronger") than the generally clearer colours attainable before, and thus more adapted for the mixing with further chromophores.

Example 60

Further Comparative Investigations Tuning Through Various Parameters, in Particular Amount of Chromophore Ion, Nature of Chromophore Ion(s), Amount of Additive and Nature of the Additive, Both, in Specific Unsmoothed Embodiments of the Present Invention and of the Prior Art Using the same procedure and the identical atomized porcelain stoneware powder (supplied by ARKIM) as in examples 1-58 as above, and employing the silica gel as of example 3 (Gr=91.86%; A=283.7 m²/g, S=260.6 m²/g) and/or ZnO as additive, the following investigations displayed in tables 60(I) 60(IV) below were carried out.

In particular, in the following, the amount of ZnO is expressed as weight percentage of Zn referred to the total ceramic mix, comprising the added ZnO. In the tests according to the invention, aqueous solutions comprising 1%-10% of iron (expressed as elemental Fe) were used on ceramic mixes added with 1.53%, 5.26%, 8.70% and 14.5% (expressed with respect to the dry ceramic mix, i.e. prior to admixing) of the silica gel additive as per example 3. In particular, aqueous iron ammonium citrate and chromium acetate were used as colorant solutions, loaded with the percentages of chromophore ions reported in tables (I)-(IV) below. One or two drops of colorant solutions (one drop weighing about 0.047±0.005 g) were applied, as likewise reported below. The samples and tiles, (out of which those containing ZnO were prepared on a metallic net support, to prevent melt-down of the tile in the kiln, due to the melt-lowering addition), were fired, this time, in a electrical laboratory kiln with a porcelain stoneware firing cycle of 50 minutes (from cold to cold) at a maximum temperature of 1205° C.

All the data reported below (including those according to the invention) have been measured on unsmoothed tiles, as the ZnO-doped embodiments underwent nevertheless deformation to an extent that it became impossible to obtain a sufficiently uniform coloured surface after smoothing.

TABLE 60(I)

| % Cr | % Fe | % additive added | Additive | L* | A* | B* | delta L* | delta a* | delta b* | delta E | Number of drops applied |
|---|---|---|---|---|---|---|---|---|---|---|---|
| 0 | 1% | 0 |  | 79.28 | 1.25 | 12.19 |  |  |  |  | 2 |
| 0 | 1% | 1.53 | Wide pore Silica - Meigao Chemical | 65.93 | 12.42 | 15.56 | −13.35 | 11.17 | 3.37 | 17.04 | 2 |
| 0 | 1% | 5.26 | Wide pore Silica - Meigao Chemical | 63.32 | 18.73 | 23.72 | −15.96 | 17.48 | 11.53 | 28.1 | 2 |
| 0 | 1% | 8.70 | Wide pore Silica - Meigao Chemical | 60.7 | 20.57 | 25.96 | −18.58 | 19.32 | 13.77 | 31.4 | 2 |
| 0 | 1% | 14.5 | Wide pore Silica - Meigao Chemical | 73.15 | 9.41 | 19.57 | −6.13 | 8.16 | 7.38 | 14.48 | 2 |
| 0 | 1% | 4.5 | Zinc oxide (expressed as % of Zn in the total mix) | 81.34 | 0.46 | 13.31 | 2.06 | −0.79 | 1.12 | 1.44 | 2 |
| 0 | 1% | 9 | Zinc oxide (expressed as % of Zn in the total mix) | 84.23 | 0.16 | 8.39 | 4.94 | −1.09 | −3.8 | 3.96 | 2 |
| 0 | 1% | 15.5 | Zinc oxide (expressed as % of Zn in the total mix) | 85.23 | 0.11 | 8.72 | 5.95 | −1.14 | −3.47 | 3.66 | 2 |

TABLE 60(II)

| % Cr | % Fe | % additive added | Additive | L* | A* | B* | delta L* | delta a* | delta b* | Delta E | Number of drops applied |
|---|---|---|---|---|---|---|---|---|---|---|---|
| 0 | 10% | 0 |  | 55.73 | 9.65 | 23.09 |  |  |  |  | 1 |
| 0 | 10% | 5.26 | Wide pore Silica - Meigao Chemical | 40.44 | 14.17 | 17 | −10.29 | 4.52 | −6.12 | 16.09 | 1 |
| 0 | 10% | 8.70 | Wide pore Silica - Meigao Chemical | 34.68 | 14.29 | 15.4 | −16.05 | 4.64 | −7.67 | 16.87 | 1 |
| 0 | 10% | 14.5 | Wide pore Silica - Meigao Chemical | 31.92 | 14.59 | 14.46 | −18.81 | 4.94 | −8.63 | 17.66 | 1 |
| 0 | 10% | 4.5 | Zinc oxide (expressed as % of Zn in the total mix) | 53.32 | 0.76 | 17.33 | 2.589 | −8.894 | −5.764 | 10.63 | 1 |
| 0 | 10% | 9 | Zinc oxide (expressed as % of Zn in the total mix) | 66.34 | 2 | 23.79 | 15.61 | −7.649 | 0.703 | 7.938 | 1 |

TABLE 60(II)-continued

| % Cr | % Fe | % additive added | Additive | L* | A* | B* | delta L* | delta a* | delta b* | Delta E | Number of drops applied |
|---|---|---|---|---|---|---|---|---|---|---|---|
| 0 | 10% | 15.5 | Zinc oxide (expressed as % of Zn in the total mix) | 68.85 | 2.33 | 25.32 | 18.12 | −7.32 | 2.23 | 8 | 1 |

TABLE 60(III)

| % Cr | % Fe | % additive added | additive | L* | A* | B* | delta L* | delta a* | delta b* | delta E | Number of drops applied |
|---|---|---|---|---|---|---|---|---|---|---|---|
| 6 | 2 | 0 | | 40.75 | 1.83 | 13.82 | | | | | 2 |
| 6 | 2 | 5.26 | Wide pore Silica - Meigao Chemical | 32.19 | 4.43 | 8.18 | −8.56 | 2.6 | −5.65 | 10.58 | 2 |
| 6 | 2 | 8.70 | Wide pore Silica - Meigao Chemical | 33.54 | 3.57 | 6.8 | −7.21 | 1.74 | −7.03 | 10.22 | 2 |
| 6 | 2 | 14.5 | Wide pore Silica - Meigao Chemical | 32.15 | 3.05 | 4.56 | −8.61 | 1.22 | −9.28 | 12.71 | 2 |
| 6 | 2 | 4.5 | Zinc oxide (expressed as % of Zn in the total mix) | 41.34 | 5.36 | 14.01 | 0.59 | 3.53 | 0.18 | 3.58 | 2 |
| 6 | 2 | 9 | Zinc oxide (expressed as % of Zn in the total mix) | 55.12 | 12.63 | 23.05 | 14.37 | 10.8 | 9.22 | 20.2 | 2 |
| 6 | 2 | 15.5 | Zinc oxide (expressed as % of Zn in the total mix) | 57.3 | 15.31 | 24.83 | 16.55 | 13.48 | 11 | 24.01 | 2 |

TABLE 60(IV)

| % Cr | % Fe | % additive added | additive | L* | A* | B* | delta L* | delta a* | delta b* | delta E | Number of drops applied |
|---|---|---|---|---|---|---|---|---|---|---|---|
| 0.6 | 1.2 | 0 | | 69.28 | 3.72 | 18.73 | | | | | |
| 0.6 | 1.2 | 1.53 | Wide pore Silica - Meigao Chemical | 54.4 | 7.21 | 14.59 | −14.88 | 3.49 | −4.14 | 15.84 | 2 |
| 0.6 | 1.2 | 5.26 | Wide pore Silica - Meigao Chemical | 40.7 | 9.28 | 13.11 | −28.58 | 5.56 | −5.62 | 29.65 | 2 |
| 0.6 | 1.2 | 8.70 | Wide pore Silica - Meigao Chemical | 38.45 | 8.99 | 11.61 | −30.84 | 5.27 | −7.12 | 32.08 | 2 |
| 0.6 | 1.2 | 14.5 | Wide pore Silica - Meigao Chemical | 42.17 | 9.81 | 13.91 | −27.11 | 6.09 | −4.82 | 42.17 | 2 |
| 0.6 | 1.2 | 9 | Zinc oxide (expressed as % of Zn in the total mix) | 75.06 | 5.42 | 24.84 | 5.78 | 1.7 | 6.11 | 8.58 | 2 |
| 0.6 | 1.2 | 15.5 | Zinc oxide (expressed as % of Zn in the total mix) | 77.15 | 5.07 | 23.17 | 7.87 | 1.35 | 4.44 | 9.14 | 2 |

As is apparent from the above tables, also testing (on unsmoothed embodiments) the use of different colorant compositions and of different additives in varying amounts, the use of the specific silica additives of the present invention leads to negative delta L* values (i.e. of a decrease in L* with respect to the additive-free reference standard), whereas the delta L* values are positive (i.e. L* increases with respect to the additive-free reference standard), if a ZnO additive as per WO 02/10092 is employed.

The invention claimed is:

1. Coloration process for obtaining on the surface and/or in the interior of fired ceramic material a variation in the resultant colour of iron-based colorant solutions comprising:
   (a) adding to a ceramic mix from 1% to 15% by weight with respect to the dry ceramic mix, precipitated silica and/or silica gel having an active surface $S \geqq 100$ m$^2$/g at the moment of coloration, said active surface S being defined by the formula $S = A*Gr$, where:

Gr is the particle size fraction comprised between 5 and 60 microns for precipitated silica and between 1 and 60 microns for silica gel, and A is the surface area of the silica expressed in m$^2$/g measured by the B.E.T. method;
   (b) applying to the surface of the additive-containing ceramic mix aqueous or organic solutions comprising inorganic salts of Fe(II) and/or Fe (III), or organic derivatives of Fe(II) and/or Fe(III);
   (c) providing a variation in the resultant colour being equal to $\Delta E > 6$.

2. The process as claimed in claim 1, further comprising adding to the ceramic mix precipitated silica and/or silica gel in a total quantity between 2% and 10% by weight of dry silica with respect to the dry ceramic mix.

3. The process as claimed in claim 2, further comprising adding to the ceramic mix precipitated silica and/or silica gel in a total quantity between 3% and 7% by weight of dry silica with respect to the dry ceramic mix.

4. The process for colouring ceramic materials as claimed in claim 1, wherein step (a) is implemented by adding precipitated silica and/or silica gel to raw materials or to a slip formed by grinding the raw materials.

5. The coloration process according to claim 1, further comprising employing at least one additive-containing ceramic mix in an inhomogeneous admixture along with further ceramic mixes.

6. The process for colouring ceramic materials as claimed in claim 1, further comprising treating the additive-containing ceramic material with aqueous solutions containing from 0.1% to 20% by weight of iron (expressed as elemental Fe) in the form of inorganic salts of Fe(II) and/or Fe (III), or organic derivatives of Fe(II) and/or Fe(III).

7. The process for colouring ceramic materials as claimed in claim 6 wherein the organic derivatives of Fe(II) and/or Fe(III) are salts and/or complexes with organic compounds chosen from the group consisting of acetylacetone; ascorbic acid;
carboxylic acids of general formula R1-COOH and/or the sodium, potassium or ammonium salt thereof in which $R_1$ represents hydrogen, a benzene ring or a C1-C9 alkyl or alkenyl group possibly substituted with from 1 to 6 —COOH, —OH, $NH_2$ and/or —SH groups;
amino acids of general formula

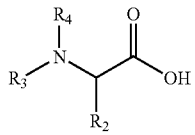

and/or a sodium, potassium or ammonium salt thereof where
$R_2$=—H, $CH_3$,

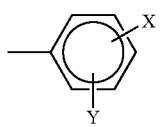

where X=—H, —$CH_3$ and Y=—H, —OH
where $R_3$ and $R_4$ can be equal or different among each other and represent hydrogen, a C1-C4 alkyl group possibly substituted with —OH groups,

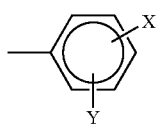

—$(CH_2)_n$—COOH where n=1-3, —$(CH_2)_m$—$NH_{(2-k)}$—$(CHR_5-COOH)_k$ in which m=1-6 and k=1 or 2, and where $R_5$=—H, $CH_3$, where X=—H, —$CH_3$ and Y=—H, —OH.

8. The process for colouring ceramic materials as claimed in claim 7, further comprising using for colouring the additive-containing ceramic material, an aqueous solution of iron ammonium citrate containing 0.3% to 20% by weight of iron (expressed as elemental Fe).

9. The process for colouring ceramic materials as claimed in claim 8, further comprising using for colouring the additive-containing ceramic material, an aqueous solution of iron ammonium citrate containing from 1% to 20% by weight of iron (expressed as elemental Fe).

10. The process for colouring ceramic materials as claimed in claim 6, wherein the colorant solutions are aqueous solutions containing iron (II) ammonium sulfate, iron (II) sulfate, iron (II) chloride, iron (II) perchlorate, potassium hexacyanoferrate (II), potassium hexacyanoferrate (III) ammonium hexacyanoferrate (II).

11. The process for colouring ceramic materials as claimed in claim 6, wherein the colorant solutions containing iron in the form of inorganic salts of Fe(II) and/or Fe (III), or organic derivatives of Fe(II) and/or Fe(III) also comprise inorganic salts and/or organic derivatives of metals chosen from the group: Co, Ni, Cr, Ru, Au, Mn, Ti, Zn, Zr, Sb, V, W, Pd or their mixtures.

12. The process for colouring ceramic materials as claimed in claim 11, wherein the colorant solutions contain 0.1-18.2% by weight of iron (expressed as elemental Fe), with a maximum cation concentration of 20%, and have a Fe/Me weight ratio between 15/1 and 1/5, where in the case of several metals different from Fe, Me means the sum by weight of the concentration of the different metals.

13. The process for colouring ceramic materials as claimed in claim 12, wherein the colorant solutions contain 0.3-18.2% by weight of iron (expressed as elemental Fe), with a maximum cation concentration of 19.5%, and have a Fe/Me weight ratio between 13.9/1 and 1/5, where in the case of several metals different from Fe, Me means the sum by weight of the concentration of the different metals.

14. The process for colouring ceramic materials as claimed in claim 1, further comprising the following operative steps:
(a) adding precipitated silica and/or silica gel to the ceramic mix to be moulded in a quantity between 1% and 15%, preferably between 2% and 10%, more preferably between 3% and 7% by weight of dry silica with respect to the dry ceramic mix;
(b) moulding the ceramic mix;
(c) drying the moulded ceramic material;
(d) treating the ceramic material derived from the preceding step with at least 2 g/m² of colorant solution;
(e) drying the ceramic material derived from the preceding step; and,
(f) firing the ceramic material.

15. The process for colouring ceramic materials as claimed in claim 14, wherein between step (c) and step (d), one or more intermediate steps (c') of pre-treating the dried material are carried out, using water or aqueous solutions of mono- or poly-carboxylic acids or of their salts.

16. The process for colouring ceramic materials as claimed in claim 15, wherein between step (d) and step (e), one or more intermediate steps (d') of post-treating the material previously treated with colorant solution are carried out, using water or aqueous solutions of mono- or poly-carboxylic acids or of their salts.

17. The process for colouring ceramic materials as claimed in claim 16 wherein step (d') is carried out post-treating with aqueous solutions comprising mono- or poly-carboxylic acids or their salts, as well as inorganic salts.

18. The process for colouring ceramic materials as claimed in claim 15, wherein between step (d) and step (e), one or more intermediate steps (d') of post-treating the material previously treated with colorant solution are carried out, using aqueous solutions of inorganic salts.

19. The process for colouring ceramic materials as claimed in claim 14, wherein between step (d) and step (e), one or more intermediate steps (d') of post-treating the material previously treated with colorant solution are carried out, using water or aqueous solutions of mono- or poly-carboxylic acids or of their salts.

20. The process for colouring ceramic materials as claimed in claim 19 wherein step (d') is carried out post-treating with aqueous solutions comprising mono- or poly-carboxylic acids or their salts, as well as inorganic salts.

21. The process for colouring ceramic materials as claimed in claim 14, wherein between step (d) and step (e), one or more intermediate steps (d') of post-treating the material previously treated with colorant solution are carried out, using aqueous solutions of inorganic salts.

22. Additive-containing ceramic mix obtained according to step (a) of claim 1.

23. An inhomogeneous mixture of ceramic mixes comprising at least one additive-containing mix as of claim 22.

* * * * *